United States Patent
Grimes

(10) Patent No.: US 11,413,518 B2
(45) Date of Patent: Aug. 16, 2022

(54) BUILDING BLOCK SYSTEM AND METHOD OF USE

(71) Applicant: Brad Grimes, Dallas, TX (US)

(72) Inventor: Brad Grimes, Dallas, TX (US)

( * ) Notice: Subject to any disclaimer, the term of this patent is extended or adjusted under 35 U.S.C. 154(b) by 0 days.

(21) Appl. No.: 15/432,748

(22) PCT Filed: Apr. 7, 2016

(86) PCT No.: PCT/US2016/026324
§ 371 (c)(1),
(2) Date: Feb. 14, 2017

(87) PCT Pub. No.: WO2017/119920
PCT Pub. Date: Jul. 13, 2017

(65) Prior Publication Data
US 2018/0296909 A1    Oct. 18, 2018

Related U.S. Application Data

(60) Provisional application No. 62/276,292, filed on Jan. 8, 2016.

(51) Int. Cl.
*A63F 9/00* (2006.01)
*A63F 9/10* (2006.01)
*A63F 9/06* (2006.01)
*A63H 33/08* (2006.01)
*G09B 19/00* (2006.01)
*G09B 1/36* (2006.01)

(52) U.S. Cl.
CPC .............. *A63F 9/10* (2013.01); *A63F 9/0641* (2013.01); *A63H 33/086* (2013.01); *A63F 2009/0661* (2013.01); *A63F 2009/1072* (2013.01); *G09B 1/36* (2013.01); *G09B 19/00* (2013.01)

(58) Field of Classification Search
CPC ...... A63H 33/08; A63H 33/06; A63H 33/086; A63H 33/088; A63H 33/062; A63F 9/0641; A63F 9/10; A63F 2009/0661; A63F 2009/1072; G09B 17/00; G09B 19/00; G09B 1/36
See application file for complete search history.

(56) References Cited

U.S. PATENT DOCUMENTS

| | | | | |
|---|---|---|---|---|
| 3,759,526 A | * | 9/1973 | Estvan, Jr. ............ | A63F 9/1204 273/294 |
| 4,030,236 A | * | 6/1977 | Schnabel ............. | A63H 33/088 446/128 |
| 5,061,218 A | * | 10/1991 | Garage ................ | A63H 33/086 446/102 |
| 5,735,723 A | * | 4/1998 | von Oppen ............ | A63H 33/04 446/117 |
| 2007/0060012 A1 | * | 3/2007 | Comfort ................ | A63H 18/00 446/168 |

(Continued)

FOREIGN PATENT DOCUMENTS

WO    WO-2017119920 A1 *  7/2017  ........... A63F 9/0641

*Primary Examiner* — Raleigh W Chiu
(74) *Attorney, Agent, or Firm* — Schwegman Lundberg & Woessner, P.A.

(57) ABSTRACT

A figure for attaching to a building block includes a body; and a base attached to the body at a first end of the base, the base has a cavity disposed within a second end of the base to slidingly attach to one or more connectors of the building block; the figure is detachably mounted on the building block.

20 Claims, 6 Drawing Sheets

(56) References Cited

U.S. PATENT DOCUMENTS

| | | | |
|---|---|---|---|
| 2015/0004570 A1* | 1/2015 | Noh | A63F 3/0402 |
| | | | 434/157 |
| 2015/0321114 A1* | 11/2015 | Broyles | A63H 33/14 |
| | | | 446/124 |
| 2016/0184727 A1* | 6/2016 | Ornstein | A63H 33/046 |
| | | | 446/92 |
| 2016/0199750 A1* | 7/2016 | Yamagishi | A63H 33/086 |
| | | | 144/364 |
| 2017/0173487 A1* | 6/2017 | Woolston | A63H 33/04 |
| 2018/0154275 A1* | 6/2018 | Semling | A63H 33/086 |
| 2018/0200636 A1* | 7/2018 | Semling | A63H 33/088 |
| 2019/0321738 A1* | 10/2019 | Chambers | A63H 3/50 |
| 2020/0038772 A1* | 2/2020 | Wong | A63H 33/107 |

* cited by examiner

BUILDING BLOCK SYSTEM AND METHOD OF USE

BACKGROUND

1. Field of the Invention

The present invention relates generally to building block systems and methods of use.

2. Description of Related Art

Building blocks are well known in the art and are effectively leisure means. In FIG. 1, a side view of a conventional block 101 is shown having a body 103 configured to form an inner cavity 105 adapted to engage with other building blocks (not shown) to create a structure. The building blocks join together via one or more connectors 107 protruding from a top surface 109 of body 103.

One of the commonly known problems with block 101 is the limited use. For example, the block 101 is composed of an elastomeric material that is not adapted for tailoring to a design need such as changing the contouring of the block and/or changing the coloring of the block. Further, when disposed of, the blocks are unsafe for the environment, thus become a waste hazard.

Although great strides have been made in the field of toy building blocks, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
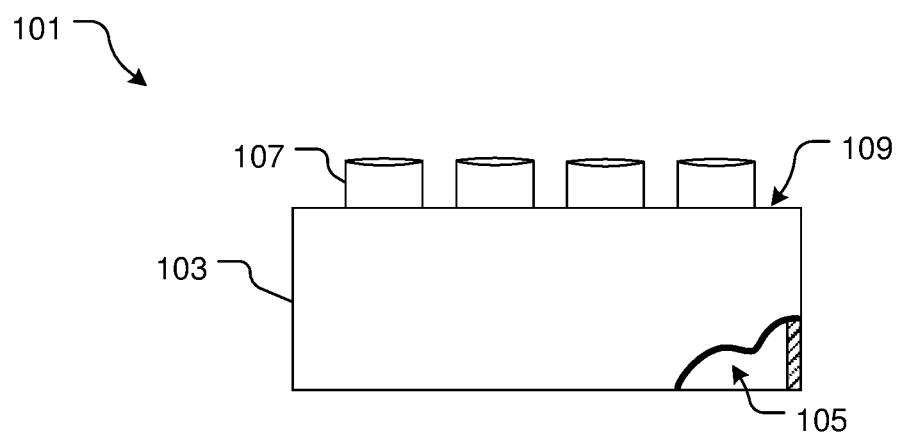
FIG. 1 is a side view of a conventional building block.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional building block systems. Specifically, the building block system and method of the present application provides effective means to tailor the building blocks for a desired contouring and provides means for printing thereon an outside surface. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
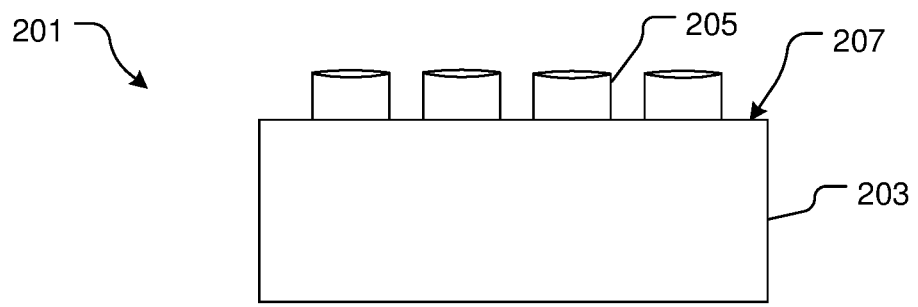
FIG. 2 is a side view of a building block in accordance with a preferred embodiment of the present application.
Figure 3:
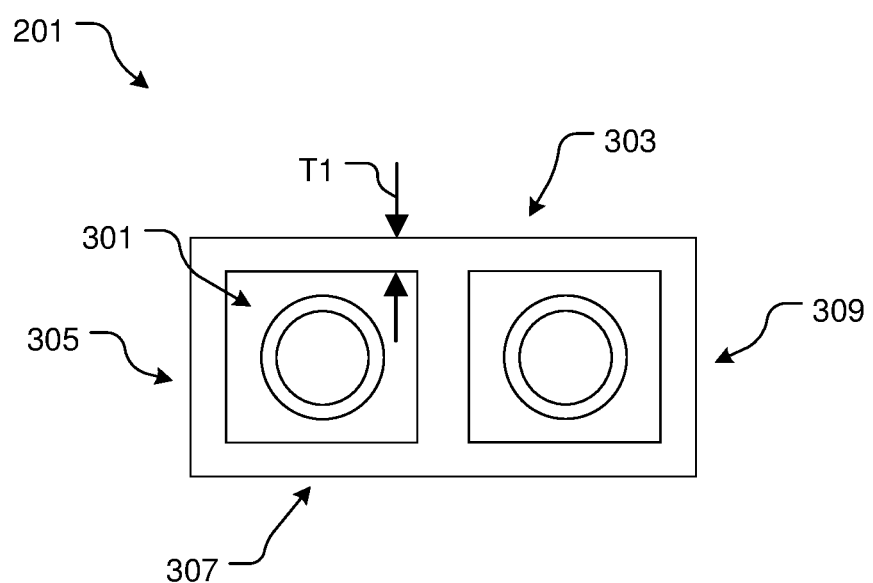
FIG. 3 is a bottom view of the building block of FIG. 2.

Referring now to the drawings wherein like reference characters identify corresponding or similar elements throughout the several views, FIGS. 2 and 3 depict respective side and top views of a building block 201 in accordance with a preferred embodiment of the present application. It will be appreciated that the method and system discussed herein overcomes one or more of the above-listed problems commonly associated with the conventional building block systems.

In the contemplated embodiment, the building block 201 includes a body 203 that forms one or more cavities 301 and connectors 205 extending from a top surface 207. In the exemplary embodiment, body 203 has four integral walls 303, 305, 307, and 309 that have a thickness T1.

Figure 4:
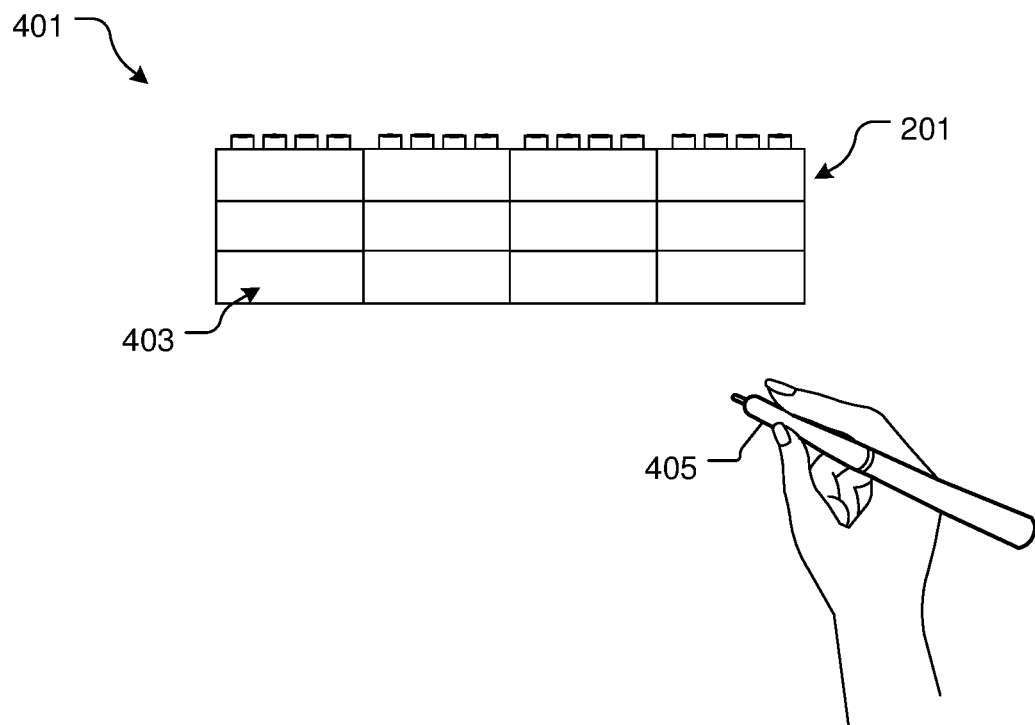
FIGS. 4, 5 and 6 are side views of a building block system.
Figure 5:
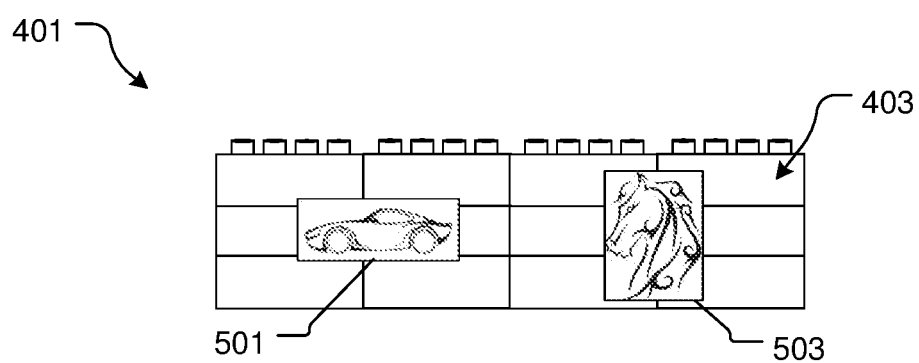

Referring now to FIGS. 4 and 5 in the drawings, a building block system 401 is shown with a plurality of building blocks 201 joined together to form a structure and a side surface 403 along the structure for writing thereon via a marker 405. As shown in FIG. 5, the surface 403 provides means for the marker 405 to draw various images, for example, images 501, 503.

One of the points of novelty believed characteristic of the present invention is manufacturing the blocks 201 of a wood material that can be easily drawn thereon via a common marker 405. It will be appreciated that a wood material provides effective means to absorb the ink from marker 405, which in turn creates a permanent image, e.g., images 501, 503 of surface 403. This feature provides significant advantages, namely, the block system now can be tailored for displaying images, which in turn could be used for learning activities. In one embodiment, the system 401 can be adapted for use as a puzzle after the image is drawn on surface 403. The user will assemble the plurality of building blocks in a predetermined arrangement to correctly recreate images 501, 503.

In yet another contemplated use, the surfaces 403 can be stained to create a desired aesthetic appearance; the wood material allows for such features.

Accordingly, the building blocks are composed of a wood material. In the preferred embodiment, the wood material is a cherry wood, which provides advantages for durability and resistance to water and other elements. Other types of wood do not provide such features.

Another point of novelty is being capable of recycling the wood blocks through decomposition and/or disposing the wood blocks through burning. These features reduce the environmental problems commonly associated with conventional elastomeric building blocks.

Figure 6:
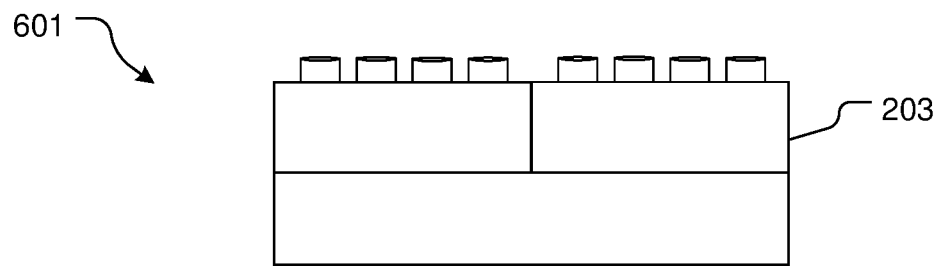
Figure 7:
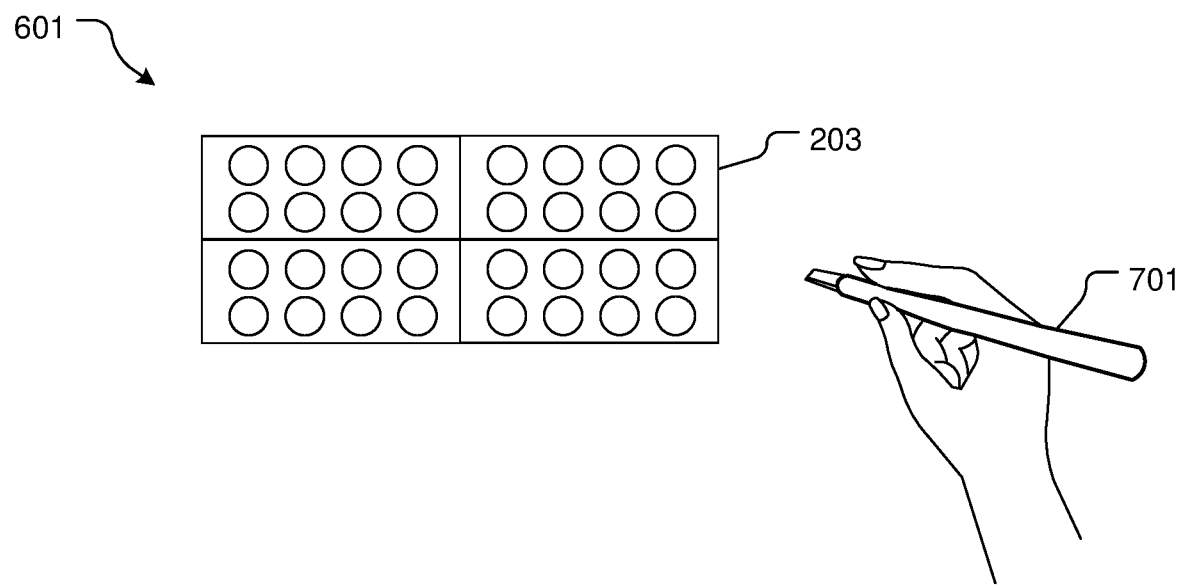
FIGS. 7 and 8 are top views of the building block system of FIG. 6.
Figure 8:
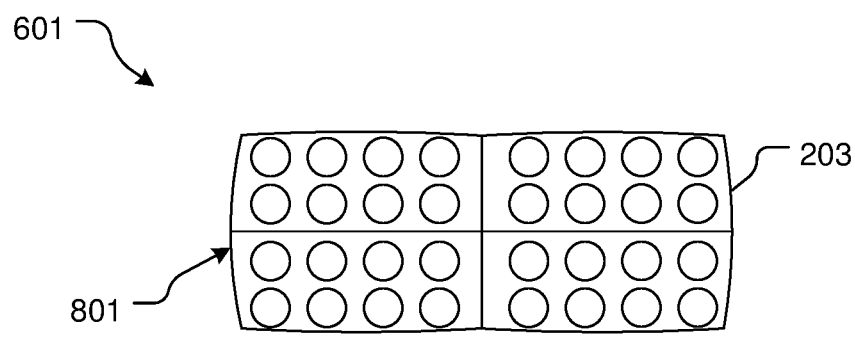

Referring now to FIGS. 6-8, a building block system 601 is shown. In the exemplary embodiments, the sides of the building block 203 are carved with knife 701 to form a contoured surface 801.

Another point of novelty believed characteristic of the present application is the ability to carve the surfaces of the building block with a conventional knife 701 to tailor the surfaces for a particular design. The finished design could then be painted and sculpted to a desired appearance. Having a building block composed of a cherry wood provides effective means to sculpt the surfaces of the building blocks.

Figure 9:
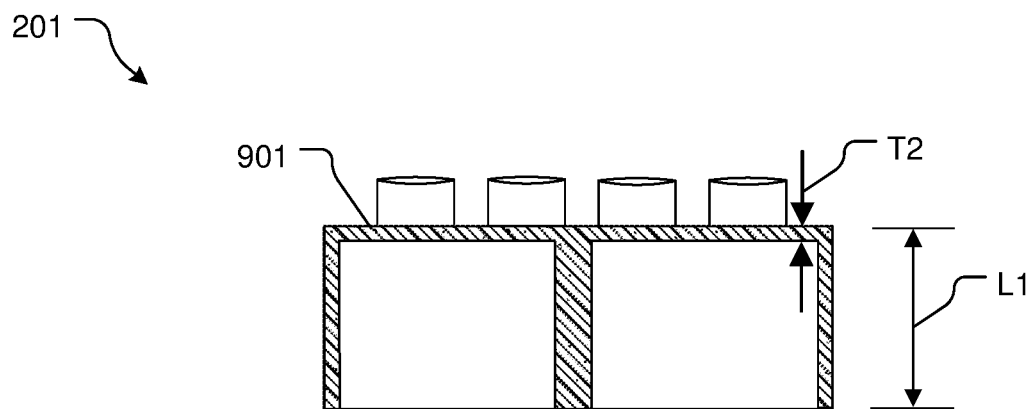
FIG. 9 is a side cross-sectional view of the building block of FIG. 2.
Figure 10:
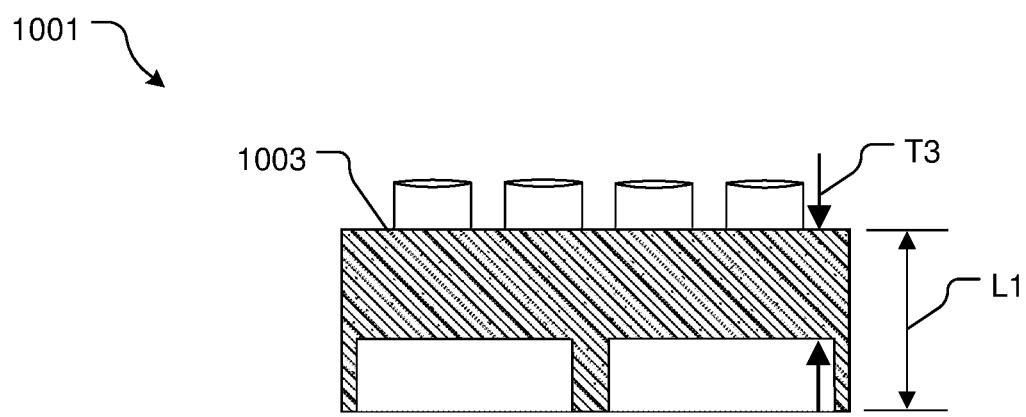
FIGS. 10 and 11 are side cross-sectional views of a building block in accordance with an alternative embodiment of the present application.
Figure 11:
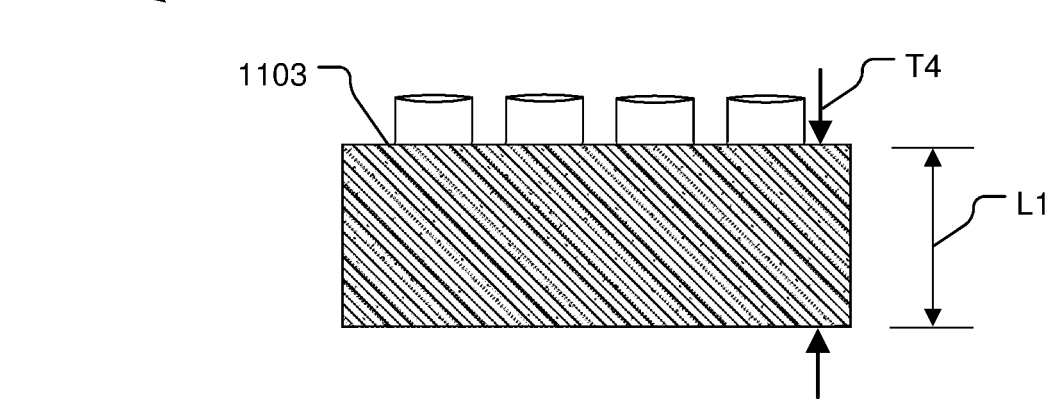

In FIGS. 9-11, three different building block are shown in cross-sectional views. Building block 201 includes a top wall 901 with a thickness T2, which is less than half the overall thickness L1 of the block. Building block 1001 has a top wall 1003 with a thickness T3, which is over half the overall thickness L1 of the block. Building block 1101 has a top wall 1103 with a thickness T4, which is over half the overall thickness L1 of the block.

Another point of novelty believed characteristic of the present invention is the utilizing block having different top wall thicknesses. It has been found that have a greater thickness T3 compared to thickness T2 joints the building blocks together in a fixed configuration. Accordingly, intended permanent structures are assembled with building blocks 1001, while building block system intended to be disassembled are formed with blocks 201. It is also contemplated having blocks 1101 formed without inner cavities, thus forming a solid body. This feature reduces manufacturing costs and provides effective means to create a solid structure when assembled.

Figure 12A:
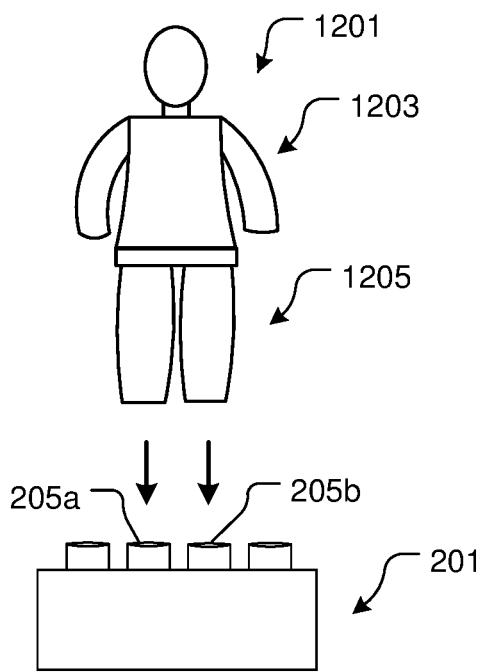
FIGS. 12 A and 12B include front views of a figure for attaching to a block.
Figure 12B:
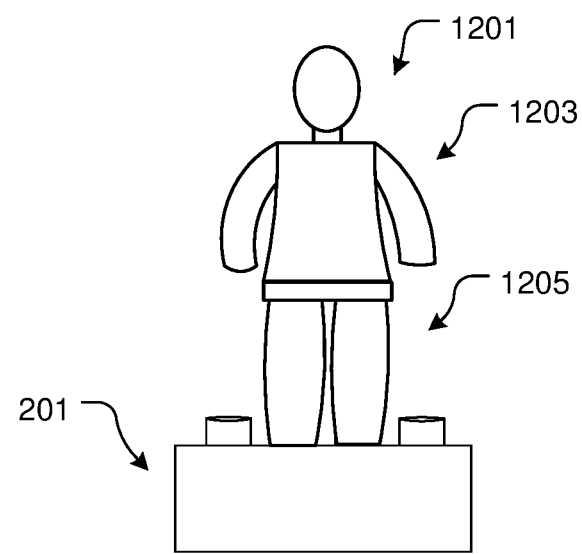
Figure 13:
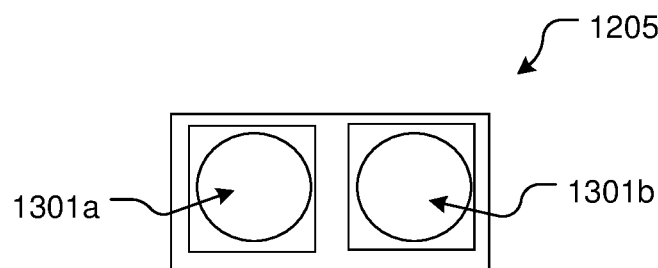
FIG. 13 shows a bottom view of a base of a figure that includes one or more recessed cavities.

In FIGS. 12A and 12B, front views of a figure 1201 for attaching to block 201 are shown. In the preferred embodiment, figure 1201 includes a body 1203 and a base 1205 attached to body 1203. As shown in a bottom view of base 1205 in FIG. 13, base 1205 includes one or more recessed cavities 1301a, 1301b configured to slidingly engage with one or more connectors 205a, 205b, wherein figure 1201 is thereby detachably mounted on block 201.

Although figure 1201 is shown as a person, it is contemplated that body 1203 and base 1205 can vary in forms such as people, animals, vehicles, and/or cartoon characters. It should further be appreciated that figure 1201 can be composed of a wood, such as cherry wood or bamboo, thereby allowing the user to paint, sculpt, and design figure 1201 as desired.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A building block system comprising:
a first block composed of a wood material, the first block having:
a first body forming four sides and a first cavity disposed within the first body, the first body having a first overall thickness; and
a first plurality of connectors integral with and protruding from a first top wall of the first body, wherein a first height of the first cavity is less than a thickness of the first top wall,
a second block composed of the wood material, the second block having:
a second body forming four sides and a second cavity disposed within the second cavity, the second body having a second overall thickness that is substantially the same as the first overall thickness; and
a second plurality of connectors integral with and protruding from a second top wall of the second body, wherein a second height of the second cavity is greater than a thickness of the second top wall; and
a third block composed of the wood material, the third block having:
a third body forming four sides, the third body having a third overall thickness that is substantially the same as the first overall thickness and the third body forming a solid structure that is devoid of a cavity; and
a third plurality of connectors integral with and protruding from a third top wall of the third body; and
wherein the first plurality of connectors are configured to engage and lock with the second cavity, the second plurality of connectors are configured to engage and lock with the first cavity, and the third plurality of connectors are configured to engage and lock with the first cavity and the second cavity.

2. The building block system of claim 1, wherein a number of the third plurality of connectors is the same as a number of the first plurality of connectors and a number of the second plurality of connectors.

3. The building block system of claim 1, wherein the sides of the first block, the sides of the second block, and the sides of the third block are configured for painting thereon.

4. The building block system of claim 1, wherein the sides of the first block, the sides of the second block, and the sides of the third block are configured for writing thereon with a writing instrument.

5. The building block system of claim 4, wherein the writing instrument includes at least one of a colored pencil or crayons.

6. The building block system of claim 1, further comprising a figure, the figure having:
- a body composed of the wood material; and
- a base composed of the wood material and attached to the body at a first end of the base, the base having:
  - a cavity disposed within a second end of the base and configured to attach to at least one of one or more of the first plurality of connectors, one or more of the second plurality of connectors, or one or more of the third plurality of connectors.

7. The building block system of claim 6, wherein the wood material includes a sustainable and biodegradable material.

8. The building block system of claim 7, wherein the wood material includes bamboo.

9. The building block system of claim 1, wherein:
- the first body of the first block includes a first additional cavity, the first additional cavity having a first additional height that is less than a thickness of the first top wall; and
- a portion of the wood material of the first body is disposed between the first cavity and the first additional cavity.

10. The building block system of claim 1, wherein:
- a first portion of at least a part of an image is disposed on a side of the first block;
- a second portion of the at least a part of the image is disposed on a side of the second block;
- a third portion of the at least a part of the image is disposed on a side of the third block; and
- the first block, the second block, and the third block are configured to form the at least a part of the image when the first block, the second block, and the third block are coupled in an arrangement.

11. The building block system of claim 10, wherein the first block, the second block, and the third block are configured for the at least the part of the image to be formed thereon using a writing instrument.

12. A building block comprising:
- a body composed of a wood material, the body having:
  - four sides;
  - a plurality of connectors integral with and protruding from a top wall of the body;
  - a first cavity disposed within the body, the first cavity having a first height that is less than a thickness of the top wall; and
  - a second cavity disposed within the body and adjacent to the second cavity, the second cavity having a second height that is less than the thickness of the top wall;
- wherein:
  - a portion of the wood material is disposed between the first cavity and the second cavity; and
  - a side of the body is configured for at least one of writing, staining, or painting thereon.

13. The building block of claim 12, wherein at least one surface of the building block is a non-linear contoured surface.

14. The building block of claim 12, wherein the wood material includes a sustainable and biodegradable material.

15. The building block of claim 12, wherein the plurality of connectors are configured to engage and lock with at least one cavity of an additional building block, the additional building block having an additional body composed of an additional wood material that is different from the wood material, and the additional body having four sides and an additional plurality of connectors integral with and protruding from an additional top wall of the additional body of the additional building block.

16. A building block system comprising:
- a first block composed of a wood material, the first block having:
  - a first body forming four sides, a first cavity disposed within the first body, and a second cavity disposed within the first body, wherein the first body has a first overall thickness; and
  - a first plurality of connectors integral with and protruding from a first top wall of the first body, wherein a first height of the first cavity is less than a thickness of the first top wall and a second height of the second cavity is less than the thickness of the first top wall;
- a second block composed of the wood material, the second block having:
  - a second body forming four sides, the second body having a second overall thickness that is substantially the same as the first overall thickness and the second body forming a solid structure that is devoid of a cavity; and
  - a second plurality of connectors integral with and protruding from a second top wall of the second body; and
  - wherein the second plurality of connectors are configured to engage and lock with at least one of the first cavity or the second cavity.

17. The building block system of claim 16, wherein the sides of the first block and the sides of the second block are configured to be carved or contoured with an instrument that includes a sharp edge.

18. The building block system of claim 16, further comprising a figure, the figure having:
- a body composed of an additional wood material; and
- a base composed of the additional wood material and attached to the body at a first end of the base, the base having:
  - a cavity disposed within a second end of the base and configured to attach to at least one of one or more of the first plurality of connectors or one or more of the second plurality of connectors.

19. The building block system of claim 18, wherein the additional wood material of the body of the figure is different from the wood material of the first body of the first block and the second body of the second block.

20. The building block system of claim 18, wherein at least one of the wood material or the additional wood material include a sustainable and biodegradable material.

* * * * *